Feb. 11, 1930.  E. ALEXANDER  1,746,573
CONVERTIBLE BODY FOR MOTOR VEHICLES
Filed May 12, 1925   6 Sheets-Sheet 1
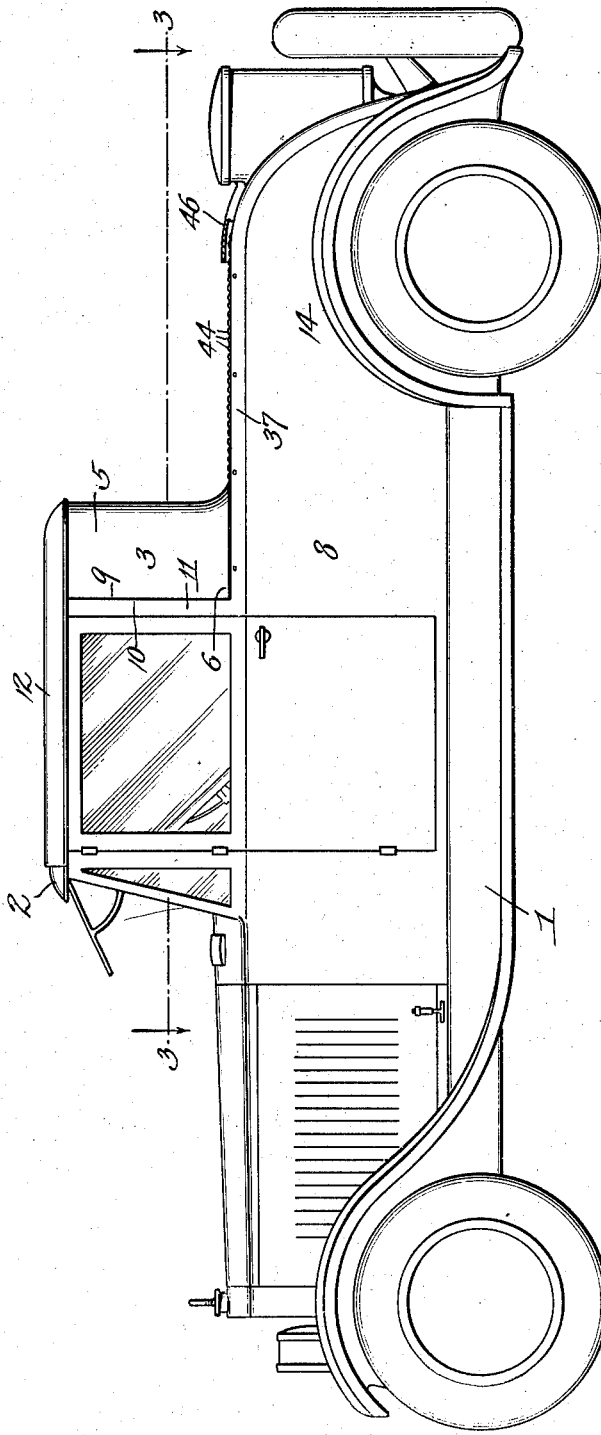
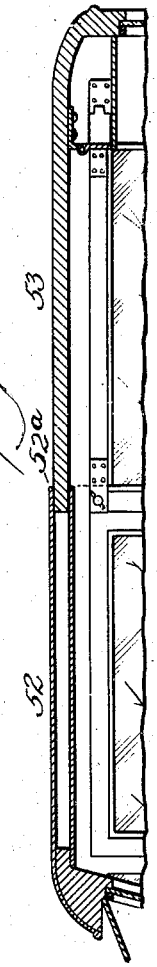
INVENTOR
Emanuel Alexander
BY
Frederick W. Barker
ATTORNEY Feb. 11, 1930.  E. ALEXANDER  1,746,573
CONVERTIBLE BODY FOR MOTOR VEHICLES
Filed May 12, 1925   6 Sheets-Sheet 2
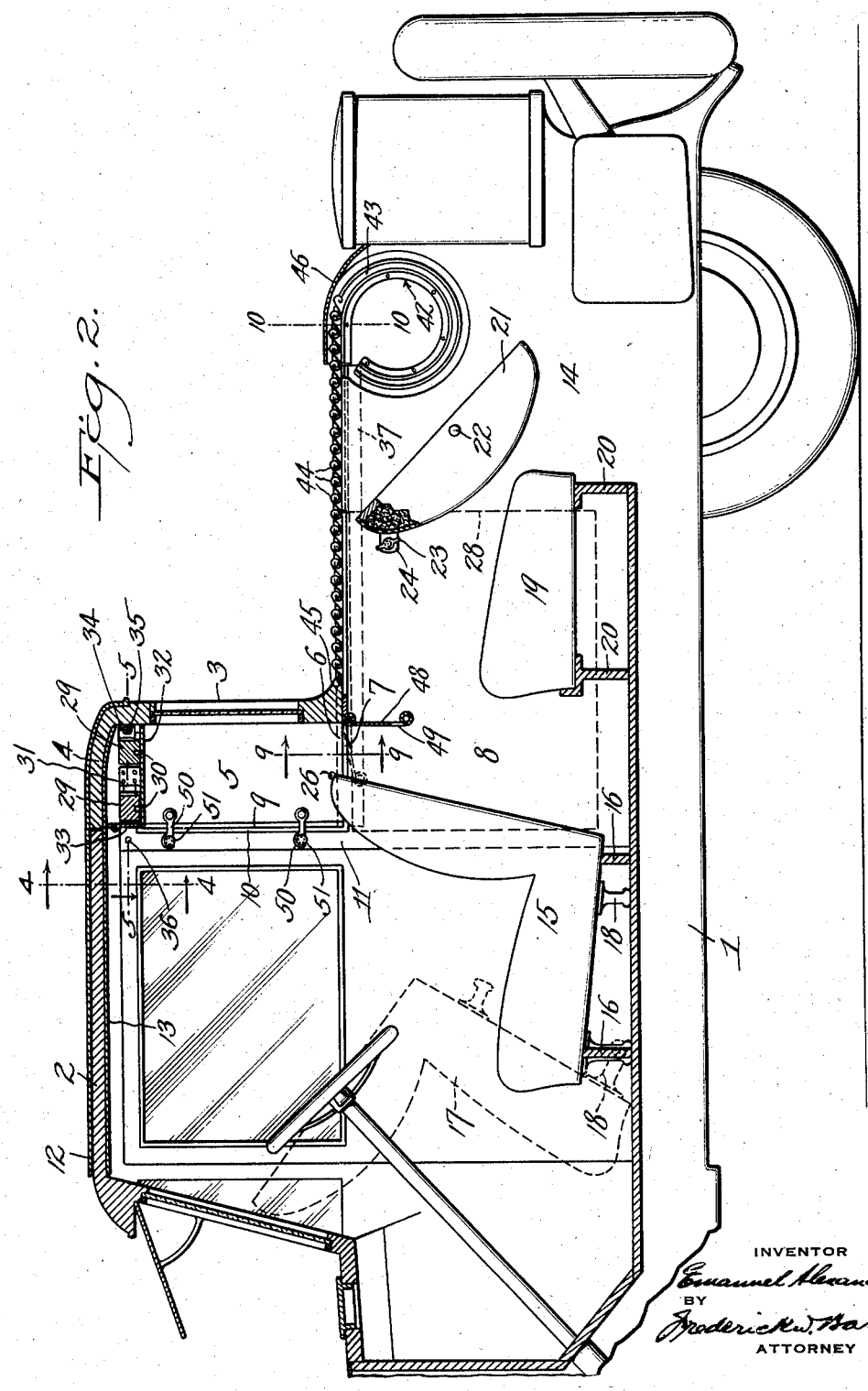
INVENTOR
Emanuel Alexander
BY
Frederick W. Barke
ATTORNEY Feb. 11, 1930.  E. ALEXANDER  1,746,573
CONVERTIBLE BODY FOR MOTOR VEHICLES
Filed May 12, 1925  6 Sheets-Sheet 3
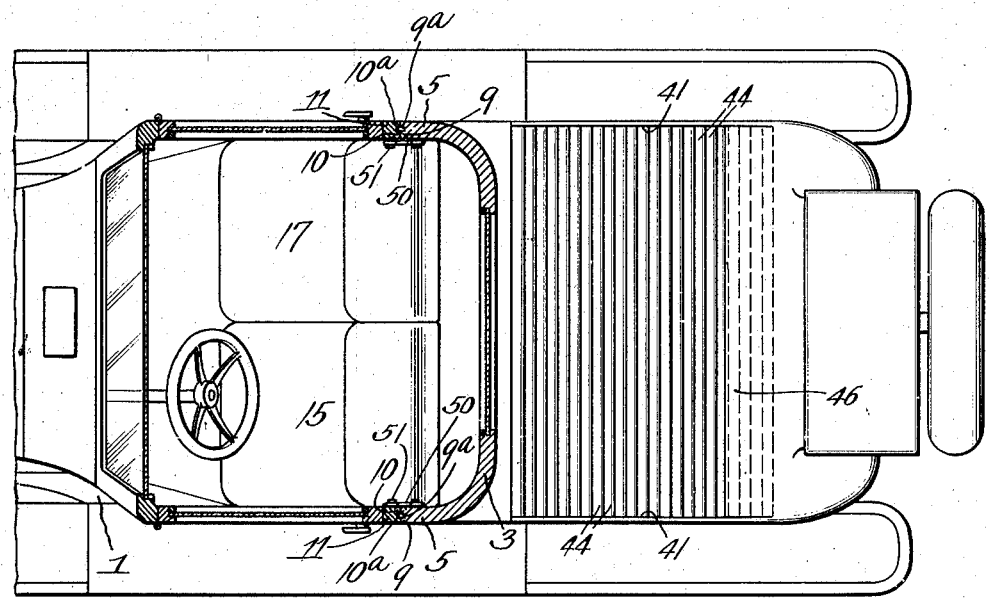
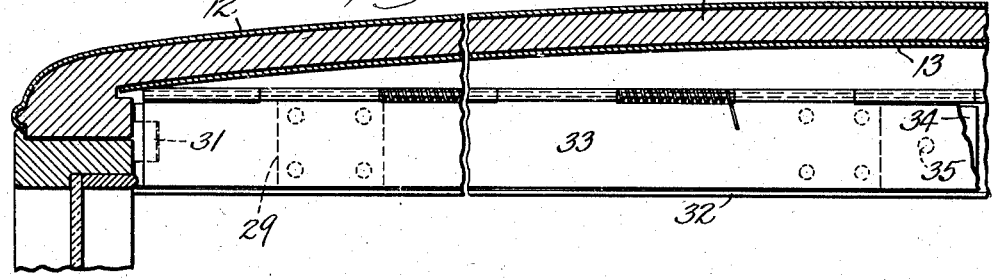
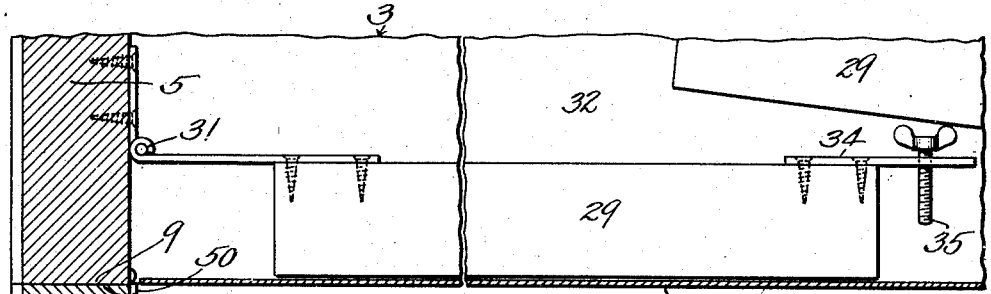

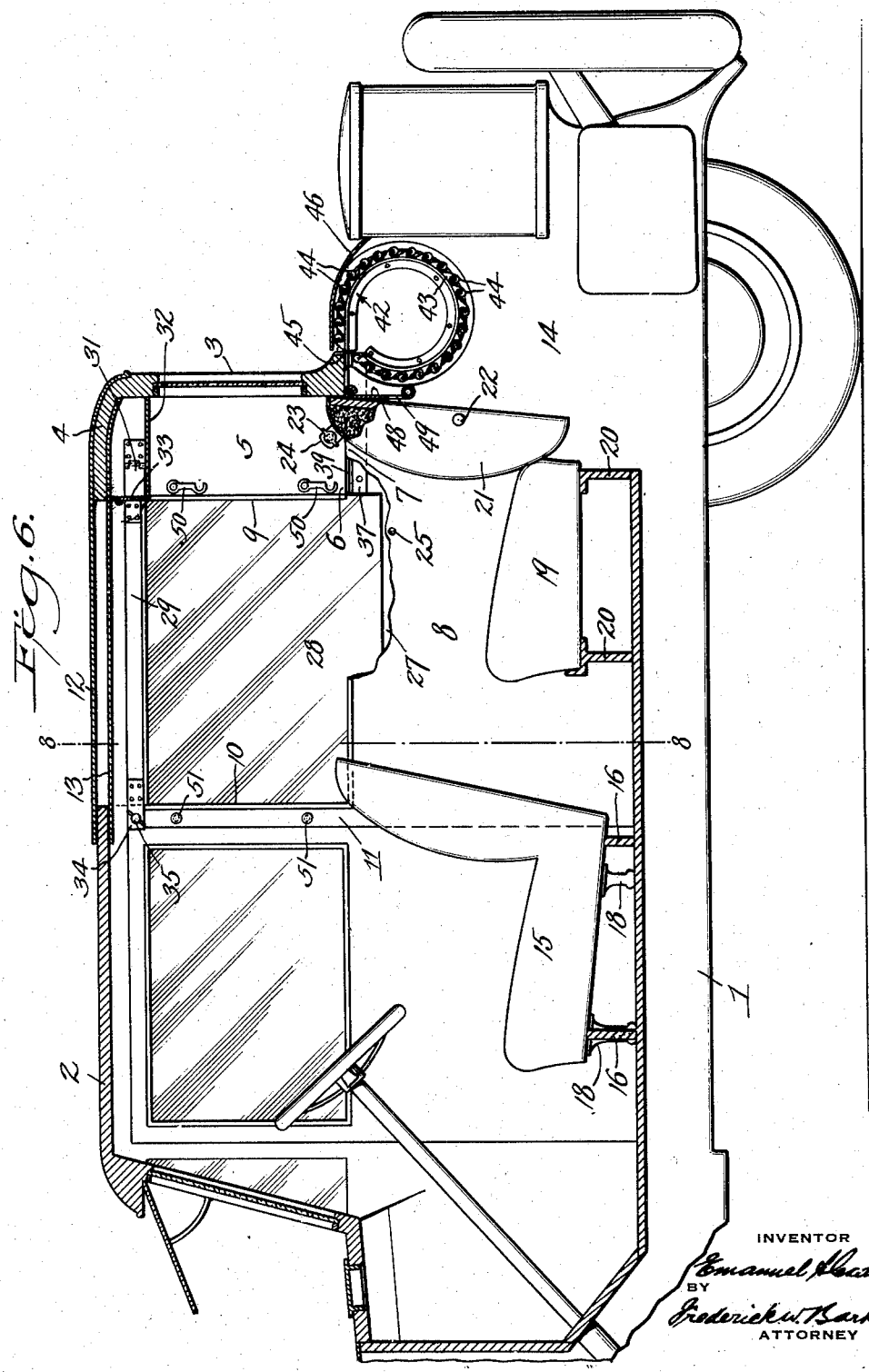

Feb. 11, 1930.  E. ALEXANDER  1,746,573
CONVERTIBLE BODY FOR MOTOR VEHICLES
Filed May 12, 1925   6 Sheets-Sheet 5
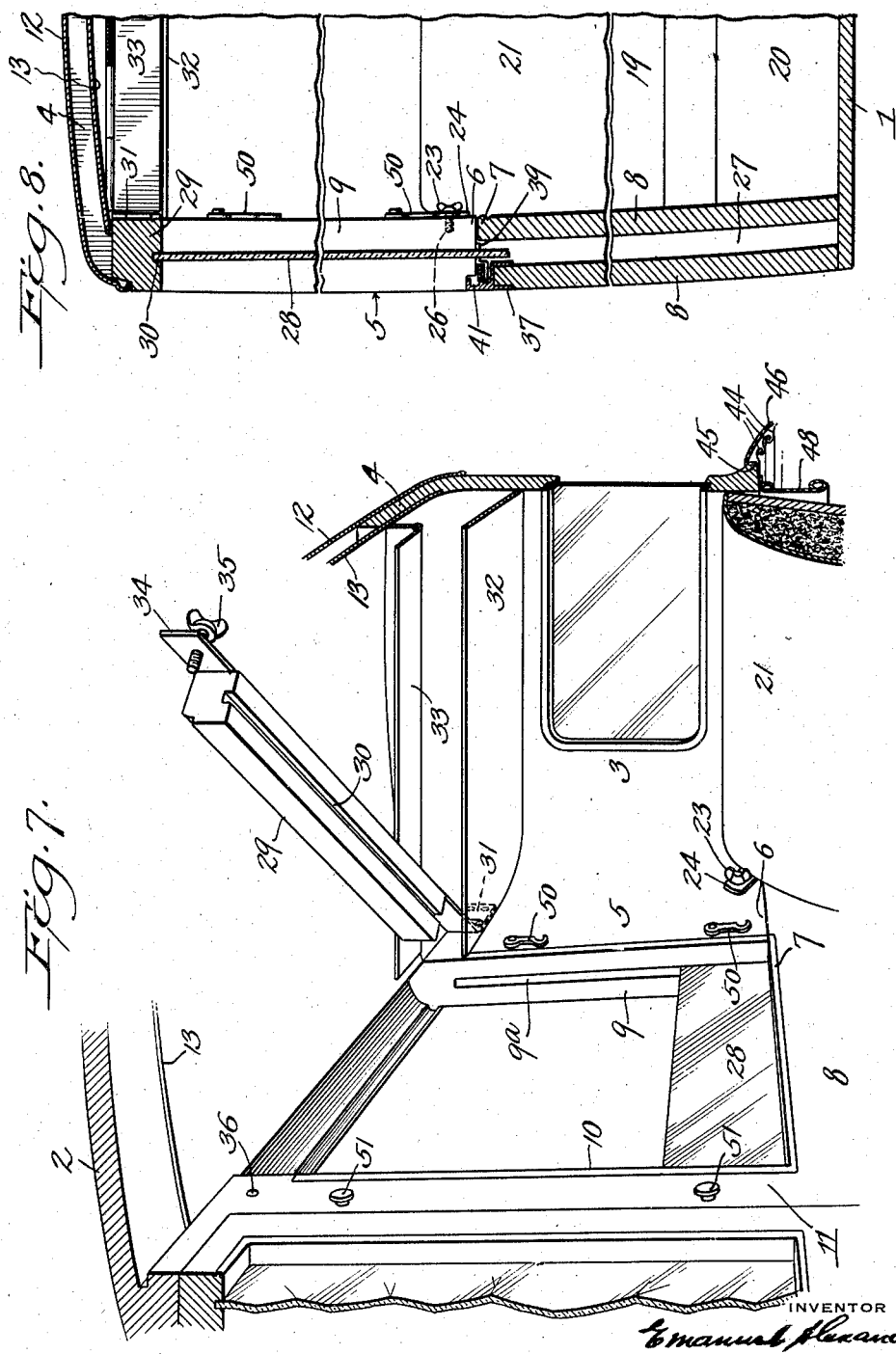
INVENTOR
Emanuel Alexander
BY
Frederick Barker
ATTORNEY

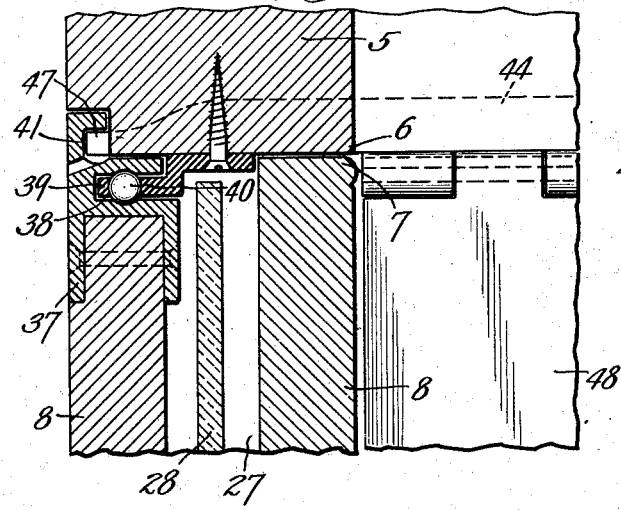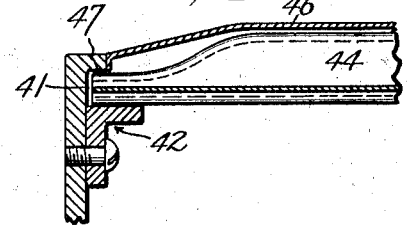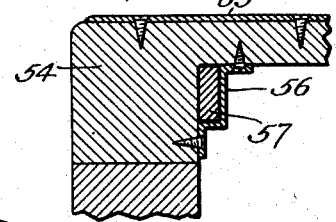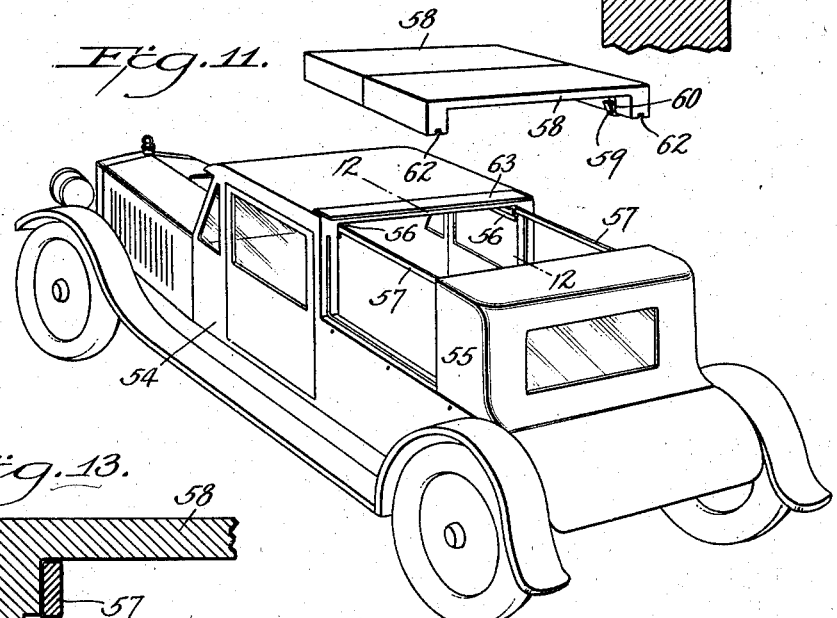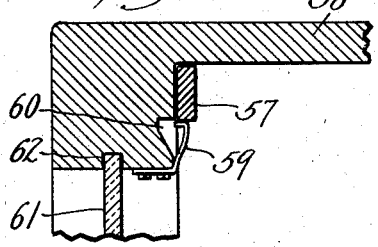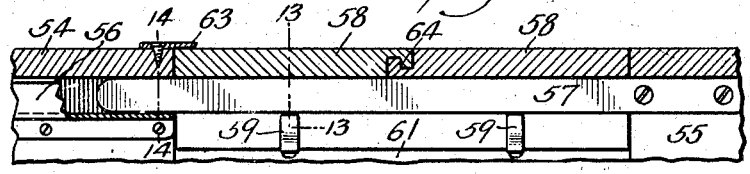

Patented Feb. 11, 1930

1,746,573

UNITED STATES PATENT OFFICE

EMANUEL ALEXANDER, OF NEW YORK, N. Y.

CONVERTIBLE BODY FOR MOTOR VEHICLES

Application filed May 12, 1925. Serial No. 29,705.

This invention relates to convertible bodies for motor vehicles, and my improvements are directed particularly to means whereby a closed vehicle body may be caused to represent and to serve as either a coupé or single seat enclosure, or a sedan or two seat enclosure.

Also my improvements comprehend a structure of such nature that the change over from one type of body to the other can be effected expeditiously and with a minimum of manual effort.

Still further it is the purpose of my invention to provide a convertible body in which the lines and appearance of the respective body types are conventional, so as to not vary materially from the lines and appearance possessed for example by other coupés and other sedans which are not convertible.

In the main my invention consists in forming the body enclosure in two parts, whereof a forward and lower rearward part is in fixed relation to the chassis, and an upper rearward part is slidable upon the lower rearward part toward and from the forward part, said upper rearward part thus being retractible toward the forward part when the body is to take the form of a coupé, and is extensible from said forward part when the body is to have the form of a sedan.

In one phase of my invention the top or roof of the body may be of telescopic character, wherein, for example, that portion of the roof carried by the upper rearward body part is hollow or sheath-like to receive the roof portion carried by the forward body portion, the roof in this manner being extensible and contractible to accommodate itself to the changes in body form. But in a modified form of my convertible body, its forward and upper rearward parts may have abutting roof portions for the coupé type which leave a gap in the extended form of the body that is to be filled in with leaves such as are provided for extensible tables. In such instance longitudinal frame bars are carried by the upper rearward body part and are slidable in guide-ways carried by the forward body part.

In effecting the transformation from coupé type to sedan type and vice-versa, the upper rearward body part is slidable upon the lower rearward body part, and attached to said upper rearward body part is a flexible apron having articulations, something in the nature of the covering for a roll top desk, said apron serving to cover the rumble that exists in the coupé type, but said apron disappearing into a curved guide receptacle provided therefor at the extremity of the lower rear body part when the body is extended into the sedan type.

Provision is made for pocketing the top frames for the side windows that serve the upper rearward body part when extended for the sedan type, these frames being hinged to said upper rearward body part, near its roof, for disposal and concealment while the body takes the form of a coupé. But for sedan use said frames are swung out upon their hinges and engaged at their free ends with the forward body part to align and secure them in their operative positions.

A support for a rear seat is provided in the well or boot and a seat imposed thereon. The seat may maintain its useful position while the body has its coupé formation, but the seat rest or back is pivoted to be adjustable, because it must be swung at an angle to diminish its height within the rumble when the flexible apron is extended thereover, but said rest or back can be swung into its vertical position and there secured for service when the upper rearward body part has been extended to provide the sedan formation.

Other features and advantages of my invention will hereinafter appear.

In the drawings:

Figure 1 is a side elevation of a motor vehicle in the form of a coupé and embodying my improvements.

Fig. 2 is a side sectional view of the same, partly broken away, and on a larger scale.

Fig. 3 is a plan view, partly in horizontal section taken on the line 3—3 of Fig. 1.

Fig. 4 is a partial cross-sectional view taken on the line 4—4 of Fig. 2.

Fig. 5 is a similar, horizontal section taken on the line 5—5 of Fig. 2.

Fig. 6 is a partial, side sectional view of the same motor vehicle in the form of a sedan.

Fig. 7 is a sectional perspective interior body view of the motor vehicle when in the form of a sedan, looking rearwardly thereof, this view particularly illustrating one of the movable window frames, and showing its place of concealment.

Fig. 8 is a partial, transverse section taken on the line 8—8 of Fig. 6.

Fig. 9 is a detail transverse section taken on the line 9—9 of Fig. 2.

Fig. 10 is a similar section taken on the line 10—10 of Fig. 2.

Fig. 11 is a perspective view of a motor vehicle provided with modified means of body conversion, the view including roof sections removed from the body.

Fig. 12 is an enlarged, partial longitudinal sectional view through the roof, with the removable sections thereof in place, taken on the line 12—12 of Fig. 11.

Fig. 13 is a section taken on the line 13—13 of Fig. 12.

Fig. 14 is a section taken on the line 14—14 of Fig. 12, and

Fig. 15 is a partial longitudinal section showing a modified form of telescopic roof construction.

While I have premised my convertible body as capable of assuming the forms of coupé and sedan types, these terms are used only arbitrarily to designate respectively a single seat enclosure and a two seat enclosure. In each of the forms available the body is equipped with a single door only at each side, so that when having the two seat form the body would be more properly styled a coach, though otherwise it resembles a sedan in appearance.

Referring first to that representation of my invention illustrated in Figs. 1 to 10, let 1 indicate the lower portion of the fixed body part and 2 the roof of said part. The term "fixed" means that said part is rigidly connected to the chassis, in contradistinction to the upper rearward part of the body which has slidably adjustable relation to said fixed part. Said upper rearward part is shown as composed of the back 3, the roof portion 4 and the sides 5, 5 that extend forwardly from the back through suitable curves or angles according to the desired body design. The sides 5, 5 have bottom edges 6, 6 lying in a horizontal plane whereby they may be imposed slidably upon the upper, complementary edges 7 of the sides 8, 8 included in the structure of the fixed body part so that the upper rearward body part may be shifted longitudinally upon said fixed body part. Also the sides 5, 5 have forward edges 9, lying in a vertical plane and adapted, in forming the coupé type, to be moved against the rearward complementary edges 10 of the side walls 11, 11, comprising part of the fixed body structure 2.

Therefore the upper, rearward body part, when shifted forwardly into contact with the upper, forward portion of the fixed body part, thereby completes the coupé formation as represented in Fig. 1. In this operation the roof portions for the respective body parts will have become telescoped, that being the means provided in this form of my invention for rendering the roof contractible and extensible. Thus the roof portion 4 comprising part of the slidable body part is seen to be extended forwardly beyond the walls 5, 5 in sheath-like form, having the upper and lower spaced members 12, 13 adapted to receive between them, or ensheath, the fixed roof 2 as the rear body part is shifted forwardly.

The roof being thus extensible and contractible, is capable of performing its function as a top covering equally for both coupé and sedan types.

It is obvious that the boot or well which exists in coupé type bodies, here indicated at 14, must be provided with a suitable removable covering that is capable of opening up said boot or well when the sedan type is desired, but the description of the means provided by me for this purpose will be given hereinafter.

The seating accommodation includes a driver's seat 15, mounted on supports 16, and, laterally aligned therewith, a passenger seat 17 which is provided with legs 18, the forward legs being pivoted to the floor in order that said seat may be tilted forwardly to provide passage-way to the rear of the body when converted to the sedan type. Also there is a rear seat 19, mounted on supports 20 and provided with a back or rest 21 that is pivoted at 22 to the sides of the body, to be thus capable of swinging from its service position, shown in Fig. 6, to an angled position such as that shown in Fig. 2, and thus collapsed below the top of the boot or well when the latter is to be converted into the coupé formation. Wing screws 23 or the like, carried by lugs 24 that extend from back 21 may be engaged in threaded sockets 25 or 26 provided in the body sides to secure said back 21 in its respective positions.

The sides 8, 8 of the fixed body part are each provided with the usual interspaces 27 to receive the disappearing windows 28, these interspaces being covered by the sides 5, 5 of the slidable body part when contracted in the coupé type. But when the slidable body part is extended, to form the sedan type, said windows may be raised and lowered according to usual practice. When thus raised said windows are adapted to engage respectively with frame members 29, and may become seated in a recess 30 provided therein. The frame members 29 are respectively carried at one end thereof by hinges 31 which are secured to the opposite sides of the slidable body part, near the roof. Being thus hinged the frame members may be swung rearwardly into a pocket provided for their reception between the roof and a horizontal plate 32 spaced below the roof, a pivotal flap 33 which forms a front cover for said pocket serving to conceal said members from view when swung therein.

The reception pocket for the frame members 29 has sufficient rearward depth to contain them when one of said members lies angularly against the face of the other, as shown in Fig. 5. This arrangement is necessary since usually the combined length of said frame members is too great to permit alignment with their free ends in opposed relation. The free end of each frame member 29 has attached thereto a projecting strap 34 which carries a winged screw 35, that is adapted when the slidable body part is extended to engage in a threaded hole 36 provided therefor in each side wall 11, to thereby secure said frame members in their operative positions. In this manner also the fixed and slidable body parts become rigidly united while extended apart in the sedan type formation.

The opposed edge surfaces 9 and 10 respectively of the sides 5 and 11 are provided with complementary grooves 9$^a$, 10$^a$ that serve as runways for the windows 28 when the body parts are extended for the sedan type.

In order that the upper rearward body part may be moved easily and freely upon the fixed body part in converting the vehicle body to either the coupé or sedan type I provide intermediate antifriction bearings of suitable character. Thus, in the example illustrated, see Fig. 9, a fitting 37 is secured to the top edge of wall 8 at its outer section, said fitting including a raceway 38, within which an angle plate 39, slotted to contain balls 40 is slidable, said angle plate being secured to the under edge surface of wall 5. Similar anti-friction means are provided at each side of the body structure. The fittings 37, which are provided with runways 41, extend rearwardly to a point near the rear end of the fixed body part, at the terminus of the rearward movement of the slidable body part, and there said fittings join fittings 42 presenting curved guideways 43, in alignment with runways 41, situated within the boot or well 14. A flexible apron, here shown as composed of articulations 44, is attached at one end to the back of the slidable body part, as at 45, said apron having sufficient length to extend over and cover the boot or well when said slidable body part is moved forwardly to form the coupé type, and said apron having its free end covered by a shield 46 that extends forwardly from the rear end of the fixed body part. Said shield 46 is disposed above and covers fittings 42 having the guide-ways 43. Consequently, in the rearward movement of the slidable body part the apron disappears under the shield 46 as its length becomes coiled within the guide-ways 43. In the apron structure here shown the articulations 44 have tapered ends 47 to permit their travel in the runways 41 and guide-ways 43 without unduly enlarging the capacity of said ways.

It will be readily appreciated that when the slidable body part is to be extended in changing the coupé type to the sedan type, it is only necessary to slide the upper rearward body part backwardly to the limit of such movement. A person within the body can easily perform this operation by pushing upon the slidable body part. Then the frame members 29 can be swung outwardly to their operative positions and secured by screwing the wing screws 35 into the threaded sockets 36, and finally the seat rest 21 can be swung to its upright position for service and secured in that position by means of the wing screws 23. In changing from the sedan type to the coupé type these operations are reversed. For convenience in drawing the slidable body part toward the upper forward portion of the fixed body part I provide handles in the form of hinged straps 48, secured to the bottom of back 3, and provided with hand hold portions 49, so that a person in the front portion of the body, grasping portions 49 can pull the slidable body part forwardly into conjunction with the upper forward body portion. The two body parts are to be secured together by suitable means, such for example as the hooks 50, pivoted to the sides 5, 5, and adapted to engage the studs 51 carried by the sides 11, 11.

In Fig. 15 there appears a modified form of telescopic roof, wherein the fixed forward roof portion is in the form of a sheath 52, and the roof portion 53 carried by the slidable body part is slidable into and out of said sheath. An advantage inherent to this form of telescopic roof is that the sheath edge 52$^a$ is directed rearwardly, thereby obviating the possibility of rain driving between the laminæ.

In Figs. 11 to 14 I have shown a modified form of collapsible roof, wherein instead of a telescopic top I employ removable sections, carried by slidable bars. Thus, in Fig. 11, the fixed body part is indicated by the reference numeral 54 and the slidable body part by 55. Angle straps 56 are secured to the upper, inner edges of the fixed body part, to comprise guide-ways, and bars 57, secured to the upper inner edges of the slidable body part, and extended longitudinally therefrom, are entered within said guide-ways and adapted to slide therein, thus permitting the slidable body part to be shifted toward and from the forward body portion. When extended in the sedan type shown in Fig. 11, one or more roof sections 58 may be fitted within the gap between the roof portions of the fixed and slidable body parts, said sections being there supported upon the bars 57, and locked in place by spring detents 59, carried by said sections and engaging under said bars; recesses 60 in the roof sections being provided to receive the detents when they are pressed out of engagement with the bars to release the sections. Said roof sections 58 also serve as upper frame members for the windows 61, and are provided with window reception grooves 62 for that purpose.

The junction between a forward roof section 58 and the rear edge of the roof portion for the fixed body part may be protected for example by a strip 63, secured to said roof portion and forming a sheath for said section.

The adjacent edges of roof sections may have interlocking means such as that shown at 64.

Variations within the spirit and scope of my invention are equally comprehended by the foregoing disclosure.

I claim:

1. A convertible body for motor vehicles, having a chassis, comprising a fixed body part upon the chassis and having forward upper-side and roof portions, a rearward upper body part longitudinally slidable upon said fixed body part, having side and roof portions, to co-act with said forward upper side and roof portions, and window frame members pivotally connected to one of said body parts respectively at opposite sides thereof, said frame members being movable into connective relation with the other body part when the body parts are extended.

2. A convertible body for motor vehicles, having a chassis, comprising a fixed body part upon the chassis and having forward upper-side and roof portions, and a rearward upper body part longitudinally slidable upon said fixed body part, having side and roof portions to co-act with said forward upper side and roof portions, said forward upper side portions and rearward upper part having complementary runways in their opposed edges to accommodate side windows in the extended relation of the body parts.

3. A convertible body for motor vehicles, having a chassis, comprising a fixed body part upon the chassis and having forward upper-side and roof portions, a rearward upper body part longitudinally slidable upon said fixed body part, having side and roof portions to co-act with said forward upper side and roof portions, window frame members pivotally connected to one of said body parts respectively at opposite sides thereof, said frame members being movable into connective relation with the other body part when the body parts are extended, and housing means for said window frame members provided in the rearward upper body part.

4. A convertible body for motor vehicles, having a chassis, comprising a fixed body part upon the chassis and having forward upper-side and roof portions, a rearward upper body part longitudinally slidable upon said fixed body part, having side and roof portions, to co-act with said forward upper side and roof portions, window frame members pivotally connected to one of said body parts respectively at opposite sides thereof, said frame members being movable into connective relation with the other body part when the body parts are extended, housing means for said window frame members provided in the rearward upper body part, and a movable front cover for said housing means.

5. A convertible body for motor vehicles, having a chassis, comprising a fixed body part upon said chassis having forward upper side and roof portions and a rumble, a rearward upper body part longitudinally slidable upon said fixed body part, a flexible apron connected at one end to the back of said slidable body part, to cover the rumble in the fixed body part when the slidable body part is shifted forwardly, and reception means in said rumble for said apron when the slidable body part is shifted rearwardly.

6. In a convertible body for motor vehicles, having a chassis, in combination, a fixed body part upon the chassis, the rear portion of said fixed body part constituting a rumble, an upper body part, having side walls and a back imposed slidably upon said fixed body part, a flexible apron attached at one end to the back of said slidable body part, guide-ways along the side walls of said fixed body part, and continuing curved guide-ways located within said rumble, the edges of the apron slidably engaging said guide-ways and being slidable in said curved guide-ways, whereby said apron may serve as a cover for said rumble when the upper body part is shifted forwardly, and may coil in said curved guide-ways when said upper body part is shifted rearwardly.

7. The combination with a motor vehicle chassis of a body therefor having a fixed part including an upper covered portion of full height and a rearward uncovered portion of reduced height, said body also having a movable rear part, provided with side and rear walls, that is slidable toward and from said upper covered portion, and a flexible apron co-acting with said movable rear part in its sliding movements to cover and uncover said rearward uncovered portion.

Executed this 8th day of May, 1925.

EMANUEL ALEXANDER.